United States Patent [19]

Hay et al.

[11] Patent Number: 4,981,499

[45] Date of Patent: Jan. 1, 1991

[54] PROCESS AND PLANT FOR SEPARATING A GASEOUS MIXTURE BY ADSORPTION

[75] Inventors: Léon Hay; Didier Crozel; Guy Simonet, all of Paris, France

[73] Assignee: L'Air Liquide, Societe Anonyme pour L'Etude et L'Exploitation des Procedes Georges Claude, Paris, France

[21] Appl. No.: 415,444

[22] Filed: Sep. 28, 1989

Related U.S. Application Data

[63] Continuation of Ser. No. 244,532, Sep. 12, 1988, abandoned, which is a continuation of Ser. No. 56,117, May 29, 1987, abandoned.

[30] Foreign Application Priority Data

Jun. 2, 1986 [FR] France .................. 86 07872

[51] Int. Cl.$^5$ .......................................... B01D 53/04
[52] U.S. Cl. ........................................ 55/26; 55/62; 55/66; 55/68; 55/75
[58] Field of Search ............. 55/25, 26, 58, 62, 68, 55/74, 75, 66, 73

[56] References Cited

U.S. PATENT DOCUMENTS

| | | | |
|---|---|---|---|
| 3,564,816 | 2/1971 | Batta | 55/26 |
| 3,703,068 | 11/1972 | Wagner | 55/62 X |
| 3,738,087 | 6/1973 | McCombs | 55/62 X |
| 3,986,849 | 10/1976 | Fuderer et al. | 55/25 |
| 4,160,651 | 7/1979 | Pivard | 55/26 |
| 4,315,759 | 2/1982 | Benkmann | 55/25 X |
| 4,350,500 | 9/1982 | Esselink | 55/26 |
| 4,375,363 | 3/1983 | Fuderer | 55/25 |
| 4,468,237 | 8/1984 | Fuderer | 55/26 |
| 4,475,929 | 10/1984 | Fuderer | 55/25 |
| 4,482,361 | 11/1984 | Whysall | 55/26 |
| 4,512,778 | 4/1985 | Simonet et al. | 55/26 |
| 4,512,779 | 4/1985 | Hay | 55/26 |
| 4,512,780 | 4/1985 | Fuderer | 55/26 |
| 4,589,888 | 5/1986 | Hiscock et al. | 55/26 |
| 4,650,500 | 3/1987 | Patel | 55/26 |
| 4,650,501 | 3/1987 | Hiscock et al. | 55/26 |

Primary Examiner—Robert Spitzer
Attorney, Agent, or Firm—Curtis, Morris & Safford

[57] ABSTRACT

Process for separating a gaseous mixture by adsorption includes the steps of: (a) a cocurrent isobaric production ($f_{p1}-f_{p2}$); (b) a pressure equalization between the adsorber undergoing decompression and another adsorber undergoing countercurrent recompression ($f_{c1}-N_4$); (c) a cocurrent partial emptying to a reservoir (f); (d) a final countercurrent decompression ($f_a$); (e) a countercurrent scavenging by the gas of the reservoir ($f_b$); (f) a countercurrent partial recompression by at least one pressure equalization ($f'_e$); (g) a countercurrent final recompression ($f'_{di}-F'_{d2}$); in which process the sum of the duration of the operations according to (c) and (d) is less than said phase shift and the sum of the durations of the operations according to (c), (d) and (e) is less than twice said phase shift; (h) at least two adsorbers are simultaneously in isobaric production, wherein: (i) the number of adsorbers is at least equal to four and less than $3+x+y$, x and y being respectively the number of adsorbers in production and the number of pressure equalizations; (j) the emptying is introduced into the storage reservoir; (k) each pressure equalization is "direct".

19 Claims, 15 Drawing Sheets

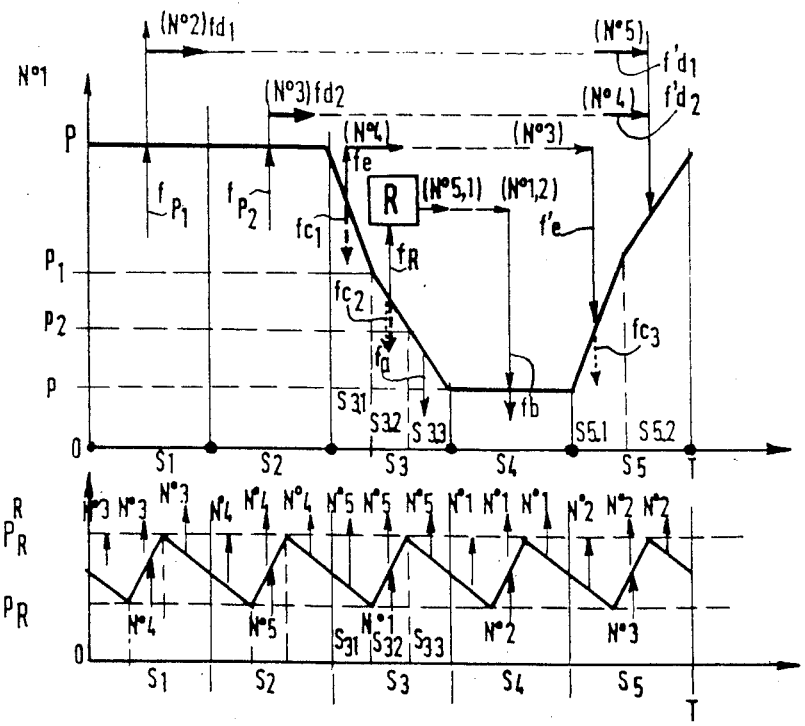
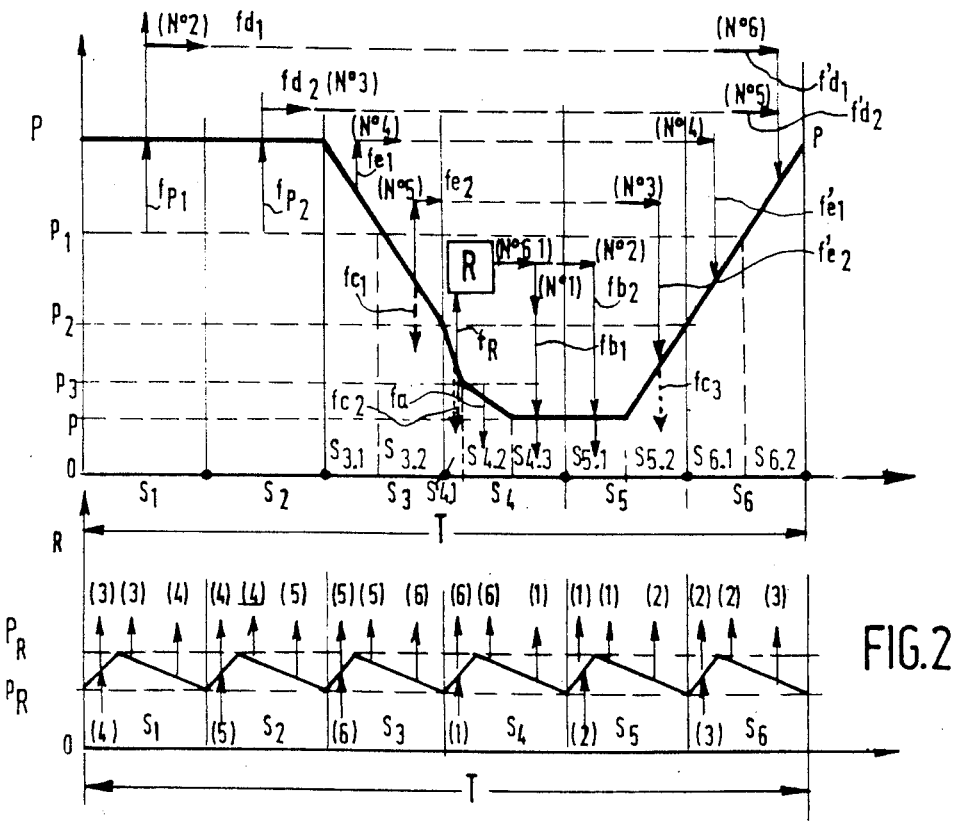
FIG.1
FIG.2

PROCESS AND PLANT FOR SEPARATING A GASEOUS MIXTURE BY ADSORPTION

This application is a continuation of application Ser. No. 244,532, filed Sept. 12, 1988, which is a continuation of application Ser. No. 056,117 filed May 29, 1987, both now abandoned.

The invention relates to a process for separating a gaseous mixture by adsorption, of the type in which there is effected on each of at least two adsorbers a cycle of the following successive operations, the cycles being staggered from each other by a phase shift equal to the duration of a cycle divided by the number of adsorbers:

(a) an operation of isobaric production at the high pressure of the cycle, termed cocurrent production;
(b) at least a pressure equalization between said adsorber undergoing cocurrent decompression and another adsorber undergoing countercurrent recompression;
(c) a partial emptying to a storage reservoir;
(d) a final countercurrent decompression at the low pressure of the cycle;
(e) a countercurrent scavenging at said low pressure by gas taken from the storage reservoir;
(f) a start of a countercurrent recompression by a pressure equalization of the type according to (b);
(g) an end of a countercurrent recompression by a flow of gas taken from the flow of the isobaric production.

The invention concerns new developments of such a process which consist in the combination of the following measures:

(i) the total number of adsorbers is at the minimum equal to four and less than $3+x+y$, x and y being respectively the number of adsorbers simultaneously in isobaric production and y the number of pressure equalizations; with $x+y$ at least equal to three,
(j) the whole of the partial emptying gas according to (c) is introduced into the storage reservoir;
(k) each pressure equalization is a "direct" pressure equalization ensuring the transfer of the gas coming from an adsorber undergoing decompression directly and immediately to an adsorber undergoing recompression.

Advantageously, the process is used for purifying hydrogen by separation of at least one undesirable constituent therefrom, such as $N_2$, $O_2$, A, CO, $CO_2$, hydrocarbons and other impurities; for the treatment of natural gas; for the elimination of impurities contained in helium; for enrichment with oxygen; and for the separation of oxygen from the air.

The features and advantages of the invention will be moreover apparent from the following description which is given by way of example with reference to the accompanying drawings in which:

FIG. 1 represents two diagrams of pressure as a function of time for an adsorber and for the storage reservoir respectively, in a cycle employing five adsorbers;

FIGS. 2 to 9 are diagrams similar to FIG. 1 of five alternative embodiments of the invention;

Figure 3:
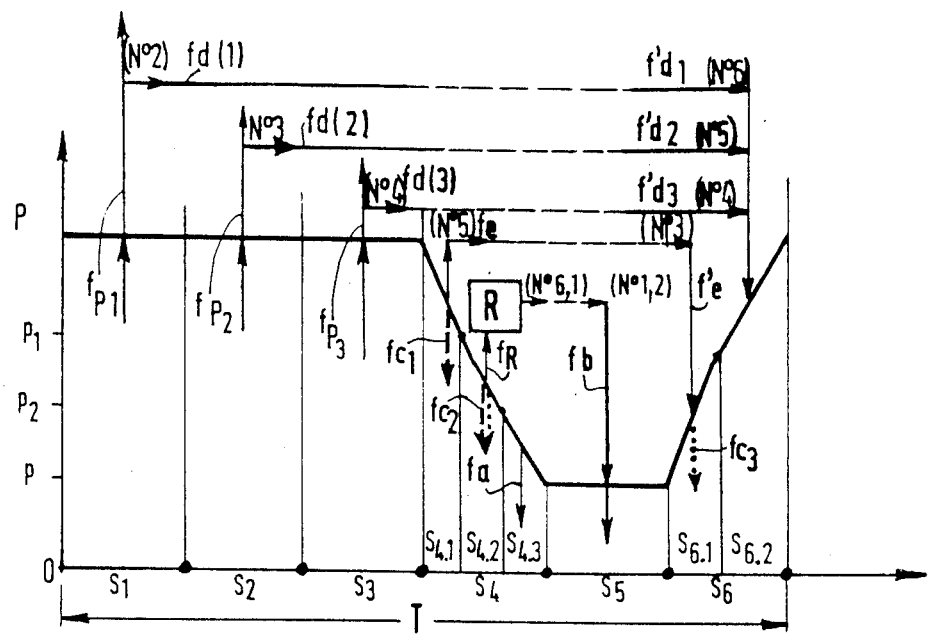

With reference to FIG. 1, a plant comprises five adsorbers and there has been shown, in full and thick line, the variation of the pressure for the adsorber No 1, the other four being designated by the numerals No 2 to No 5.

In the conventional manner, in the diagrams, the lines oriented by arrows indicate the movements and the destinations of the gas currents: when the arrows are parallel to the axis of the ordinates, they indicate, moreover, a longitudinal circulation in an adsorber: when an arrow points in the direction of increasing ordinates, the current is said to be cocurrent in the adsorber, i.e. in the direction of flow during the production operation; if the arrow pointing upwardly is located below the line indicating the pressure in the adsorber, this indicates that the current enters the adsorber through the inlet end of the adsorber; if the arrow, pointing upwardly, is located above the line indicating the pressure, the current issues from the adsorber through the outlet end of the adsorber, the inlet and outlet ends being always defined as respectively those of the entry of the gas to be treated and of the exit of the gas withdrawn in the isobaric production operation; when an arrow points in the direction of decreasing ordinates, the current is said to be countercurrent in the adsorber, i.e. in the direction opposed to the flow during the production step. If the arrow, pointing downwardly, is located below the line indicating the pressure of the adsorber, the current issues from the adsorber through the inlet end of the adsorber; if the arrow, pointing downwardly, is located above the line indicating the pressure, the current enters the adsorber through the outlet end of the adsorber. The arrows pointing in the increasing direction of the abscissae indicate the transfer flows from one adsorber to another with the notation of the adsorber numeral (in parentheses) to which the gas current is directed, when the arrow leads from a current line corresponding to a gas outlet of an adsorber or of a storage reservoir designated by the letter R and a notation of the adsorber numeral (in parentheses) from which comes the gas current when the arrow rejoins a gas current line corresponding to an introduction of gas in an adsorber. The arrows oriented in the direction of the abscissae are united by dotted lines signifying that the gas current travels toward or comes from an adsorber other than the adsorber No 1.

In the processes described below, different operations, which are all known per se, are combined in the course of a cycle, whose duration is always designated by T and which is divided into a certain number of phases equal to the number of adsorbers in cyclic operation, each of which is of a duration equal to $S=T/n$ (n being the number of adsorbers) and is designated by $S_1$, $S_2$, ... $S_n$. The duration of an operation of a cycle is, as the case may be, greater than, equal to, or less than the duration of a phase. The operations may be carried out in one or more steps. If a phase has a plurality of steps, the duration of the step is represented by subdividing the duration of the designated phase by numbers of order 1, 2, 3, etc. For example, if a phase $S_x$ has three steps, the durations of the latter will be designated by $S_{x.1}$, $S_{x.2}$, $S_{x.3}$.

The gas currents corresponding to a step are represented by the symbol $f_p$ followed by a letter representing the type of operation and the order number of the step being effected in this operation.

The operations constituting the process are all of one of the following six steps:

either a production with P constant of the gas produced, termed isobaric production, the cocurrent circulation of the gas in the adsorber, designated by $f_p$ being achieved by an intake of mixture and a withdrawal of the gas produced. If this isobaric production involves a plurality of phases, it is subdivided into a plurality of steps distinguished by an order number according to the order of succession of the phases, for example $f_{p1}$, $f_{p2}$, for the steps corresponding to the durations of the phases $S_1$ and $S_2$.

When the production operation only has a single step $f_p$, the production in a plant having n adsorbers is carried out in a continuous manner by a single adsorber, each in turn with permutation of period S. When the production operation has a plurality of steps $f_{p1}$, $f_{p2}$, ... the production is carried out in a simultaneous and continuous manner by as many adsorbers as there are production steps in the elementary cycle. For example, with reference to FIG. 1, the cycle has two production steps; when the adsorber No 1 is in production at $S_1$ according to $f_{p1}$, simultaneously, the adsorber No 5 is in production at $S_2$ according to $f_{p2}$; when the adsorber No 1 is in production at $S_2$ according to $f_{p2}$, simultaneously, the adsorber No 2 is in production at $S_1$ according to $f_{p1}$, and so on.

or one or more pressure equalizations between two adsorbers and, in this case, the gas current of the adsorber undergoing decompression issues from the outlet end, i.e. it is still flowing in a cocurrent manner, while this current enters the other adsorber undergoing repressurization by the outlet end, i.e. flows in a countercurrent manner in this adsorber. Such a pressure equalization is designated by the arrows $f_e$-$f'_e$, the gas issuing from the adsorber undergoing decompression being designated $f_e$ and the gas travelling toward the adsorber undergoing repressurization being indicated $f'_e$. If there are a plurality of pressure equalizations, the arrows $f_e$-$f'_e$ are given an index 1, 2 or 3 indicating that it concerns the first, second or third pressure equalization. Thus, the index $f_{e2}$-$f'_{e2}$ signifies a second pressure equalization with $f_{e2}$ corresponding to the gas current issuing from the adsorber undergoing decompression; and $f'_{e2}$ corresponding to the gas current flowing to the adsorber undergoing recompression;

or a partial emptying of an adsorber to a storage reservoir R, which operation is designated by $f_R$ and is always carried out in a cocurrent manner;

or a final depressurization to the minimum pressure of the cycle of an adsorber which is always effected in a countercurrent manner, i.e. through the inlet end and which is designated by $f_a$;

or a scavenging or elution step of a decompressed adsorber which is carried out with gas taken from the storage reservoir R and which scavenges the adsorber in a countercurrent manner at the minimum pressure of the cycle, that is from the outlet end to the inlet end and which is indicated by $f_b$;

or a final countercurrent recompression by withdrawing a part of the gas produced in one or more adsorbers undergoing production and which is designated by $f_d$-$f'_d$, the gas issuing from the adsorber undergoing production being marked $f_d$ and the gas entering the adsorber undergoing recompression being marked $f'_d$. If the withdrawals are effected in a plurality of production steps, they are differentiated by an order number associated with the production step number, for example $f_{d1}$-$f'_{d1}$, $f_{d2}$-$f'_{d2}$ for the production steps 1 and 2.

As concerns the pressures:

P designates the maximum cycle pressure;
p designates the minimum cycle pressure;
$p_1$, $p_2$, $p_3$, ... designate the first, as the case may be, the second, and third intermediate pressures between P and p;

$P_R$ and $p_R$ designate the maximum and minimum pressures in the storage reservoir R with a mention in certain diagrams of the numerals of the adsorbers supplying the reservoir R (noted below the horizontal line leading from R) and the numerals of the adsorbers fed by the storage reservoir R (noted above this line). Thus, in FIG. 1 where five adsorbers are employed with a cycle of a period T divided into five phases of duration $S_1$, $S_2$, $S_3$, $S_4$, $S_5$ equal to T/5, the adsorber No 1 is subjected to the following successive operations:

a cocurrent isobaric production at pressure P in two steps of duration respectively $S_1$ and $S_2$ with supply of gas to be treated and withdrawal of gas produced according to $f_{p1}$ and $f_{p2}$, and with a taking off, on one hand, of a partial current $f_{d1}$ directed to the adsorber No 2 to effect partially its final recompression and, on the other hand, of a partial current $f_{d2}$ directed to the adsorber No 3 to effect partially its final recompression. The production operation of the elementary cycle is carried out in two steps, the production in the plant having five adsorbers employing this cycle is carried out simultaneously and continuously on two adsorbers.

a pressure equalization in a single step of duration $S_{3.1}$ between the adsorber No 1 and the adsorber No 4 by a cocurrent partial decompression $f_e$ of the adsorber No 1 and a countercurrent partial recompression $f'_e$ of the adsorber No 4. The pressure of the adsorber No 1 drops from the pressure P to $p_1$ while the pressure of the adsorber No 4 rises from the minimum pressure p to $p_1$.

a cocurrent partial emptying according to $f_R$ of duration $S_{3.2}$ of the adsorber No 1 to the reservoir R whose pressure increases from the minimum $p_R$ to the maximum $P_R$, the pressure of the adsorber No 1 dropping from the first intermediate pressure $p_1$ to the second intermediate pressure $p_2$;

a final decompression, for example communication with the air, in a countercurrent manner according to $f_a$ of duration $S_{3.3}$, the pressure of the adsorber No 1 dropping from the second intermediate pressure $p_2$ to the minimum pressure p of the cycle;

a countercurrent scavenging or elution according to $f_b$ of duration $S_4$ with gas taken from the reservoir R;

a countercurrent partial recompression by pressure equalization with the adsorber No 3 according to $f'_e$ of duration $S_{5.2}$ from the minimum pressure $p_1$ to the first intermediate pressure of the cycle p;

a final countercurrent recompression according to $f'_{d1}$ and $f'_{d2}$ of duration $S_{5.2}$ from the pressure $p_1$ to the maximum pressure P of the cycle, by simultaneous withdrawals from the production current at the outlet of the adsorbers No 4 and No 5.

The cycle recommences for the adsorber No 1 in the manner described hereinbefore and the other four adsorbers No 2, No 3, No 4 and No 5 carry out exactly the same operations with a stagger of T/5 while the pressure in the reservoir R changes alternately from pressure $p_R$ to pressure $P_R$. Thus, during the period $S_{3.2}$, the reservoir R being initially at an intermediate pressure between $P_R$ and $p_R$, gas is withdrawn from the reservoir R according to $f_b$ until the pressure of R reaches $p_R$ so as to elute the adsorber No 5. During the period $S_{3.1}$, the reservoir R receives the gas issuing from the adsorber No 1 according to $f_R$, simultaneously a part of the gas is stored in R and another part is withdrawn for pursuing the elution of the adsorber No 5 according to $f_b$ and the pressure of the reservoir reaches $P_R$. Lastly, during the period $S_{3.3}$, another part of the gas stored in R is withdrawn for completing the elution of the adsorber No 5 according to $f_b$ and the pressure of the reservoir R again drops to the intermediate pressure between $P_R$ and $p_R$.

With reference now to FIG. 2, a plant here comprises six adsorbers No 1 to No 6 and there has been shown in detail the cycle of the adsorber No 1 and of the reservoir R as a function of time during a cycle T which is subdivided into six phases $S_1$, $S_2$, $S_3$, $S_4$, $S_5$, $S_6$, all of equal duration, and which includes the following operations:

production in two steps according to $f_{p1}$ of duration $S_1$ and $f_{p2}$ of duration $S_2$ with a cocurrent isobaric withdrawal and a branching off of a part $f_{d1}$ to the adsorber No 2 which is undergoing final recompression, from the first intermediate pressure p to the maximum cycle pressure P, and a branching off of a part $f_{d2}$ to the adsorber No 3 also undergoing final recompression from $p_1$ to P. According to this cycle, the production of the plant is carried out simultaneously by two adsorbers;

pressure equalization which is divided into two steps:
  first cocurrent-countercurrent pressure equalization operation $S_{3.1}$ according to $f_{e1}$-$f'_{e1}$ from the adsorber No 1 to the adsorber No 4 whose pressure increases from the second intermediate pressure $p_2$ to the first intermediate pressure $p_1$, while the adsorber No 1 is decompressed from the maximum cycle pressure P to the pressure $p_1$;
  second cocurrent-countercurrent pressure equalization of duration $S_{3.2}$ according to $f_{e2}$-$f'_{e2}$ from the adsorber No 1 to the adsorber No 5 whose pressure changes from the minimum cycle pressure p to the second intermediate cycle pressure $p_2$ while the adsorber No 1 is decompressed from $p_1$ to the second intermediate pressure $p_2$;

partial cocurrent emptying of the adsorber No 1 to the reservoir R according to $f_R$ of duration $S_{4.1}$, the adsorber No 1 having a pressure which changes from the second intermediate pressure $p_2$ to a third intermediate pressure $p_3$;

final countercurrent decompression according to $f_R$ of duration $S_{4.2}$ of the adsorber No 1 whose pressure changes from the third intermediate pressure $p_3$ to the minimum cycle pressure p;

countercurrent elution of the adsorber No 1 according to $f_{b.1}$ of duration $S_{4.3}$ with gas issuing from the reservoir R (gas essentially coming from the adsorber No 1) then according to $f_{b2}$ of duration $S_{5.1}$ with gas still coming from the reservoir R (gas essentially coming from the last but one decompression of the adsorber No 2);

partial recompression in two steps:
  first step, the adsorber No 1 is recompressed in a countercurrent manner from the minimum pressure p to the second intermediate pressure $p_2$ by pressure equalization with the adsorber No 3 according to $f'e_2$ of duration $S_{5.2}$.
  second step, the adsorber No 5 is recompressed in a countercurrent manner from the second intermediate pressure $p_2$ to the first intermediate pressure $p_1$ by pressure equalization with the adsorber No 4 according to $f'e_1$ of duration $S_{6.1}$.

final recompression: the adsorber No 1 is recompressed in a countercurrent manner from the first intermediate pressure $p_1$ to the maximum cycle pressure P simultaneously according to $f'_{d1}$ and $f'_{d2}$ of duration $S_{5.2}$ with gas issuing from the withdrawals at the outlet of the adsorbers No 6 and No 5 undergoing isobaric production.

With reference to FIG. 3 which concerns a plant with six adsorbers, there are in this arrangement the same successive operations as those met with in FIG. 1 except that the isobaric production is carried out, not during a period equal to two phases as in FIG. 1, but during a period equal to three phases. Three adsorbers are then undergoing permanent isobaric production according to $f_{p1}$, $f_{p2}$, $f_{p3}$.

The first decompression of the adsorber No 1 is effected by pressure equalization of the pressures with adsorber No 5 according to $f_e$ of duration $S_{4.1}$, the durations of the second decompression according to $f_R$, of the last decompression according to $f_a$ and of the elution according to $f_b$ are respectively $S_{4.2}$, $S_{4.3}$ and $S_5$. The first partial recompression of the adsorber No 1 is effected by pressure equalization of the pressures with adsorber No 3 according to $f'_e$ of duration $S_{6.1}$. The final recompression is effected by gas issuing from the simultaneous withdrawals at the outlet of the adsorbers Nos 4, 5 and 6 undergoing isobaric production according to $f'_{d1}$, $f'_{d2}$, $f'_{d3}$ of duration $S_{6.2}$.

Figure 4:
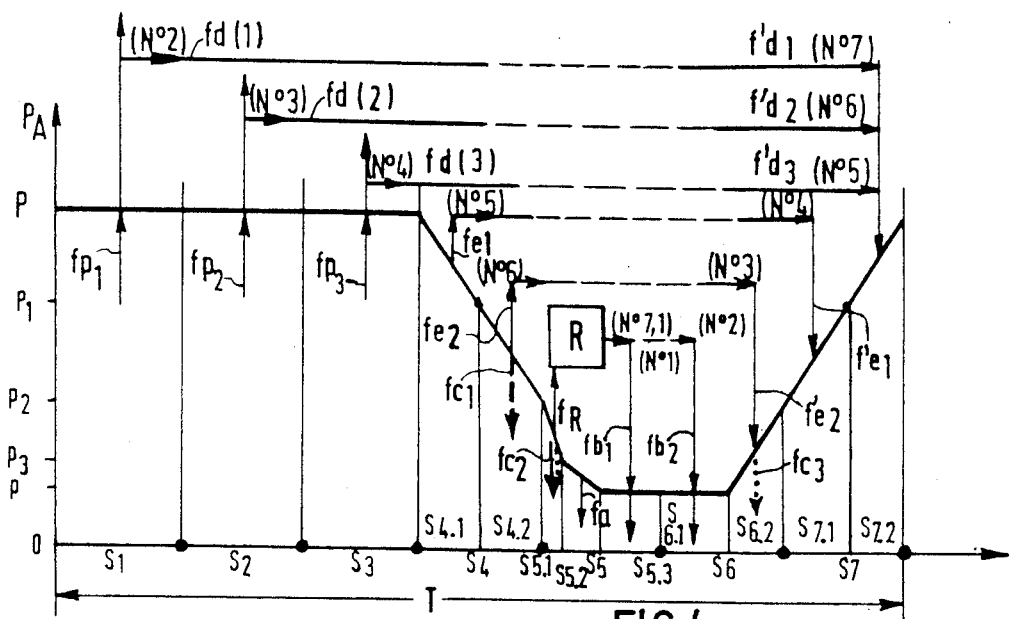

With reference now to FIG. 4 which illustrates a cycle having seven adsorbers Nos 1 to 7 and seven cycle phases $S_1$ to $S_7$, there are here again three adsorbers undergoing isobaric production, as in FIG. 3, while two decompressions are produced by pressure equalization between adsorbers, for the adsorber No 1 during $S_{4.1}$ with the adsorber No 5 according to $f_{e1}$, then during $S_{4.1}$ with the adsorber No 6 according to $f_{e2}$, while these two pressure equalizations for recompression are resumed for the adsorber No 1 first of all during $S_{6.2}$ with the adsorber No 3 according to $f'_{e2}$ then during $S_{7.1}$ with the adsorber No 4 according to $f'_{e1}$.

Figure 5:
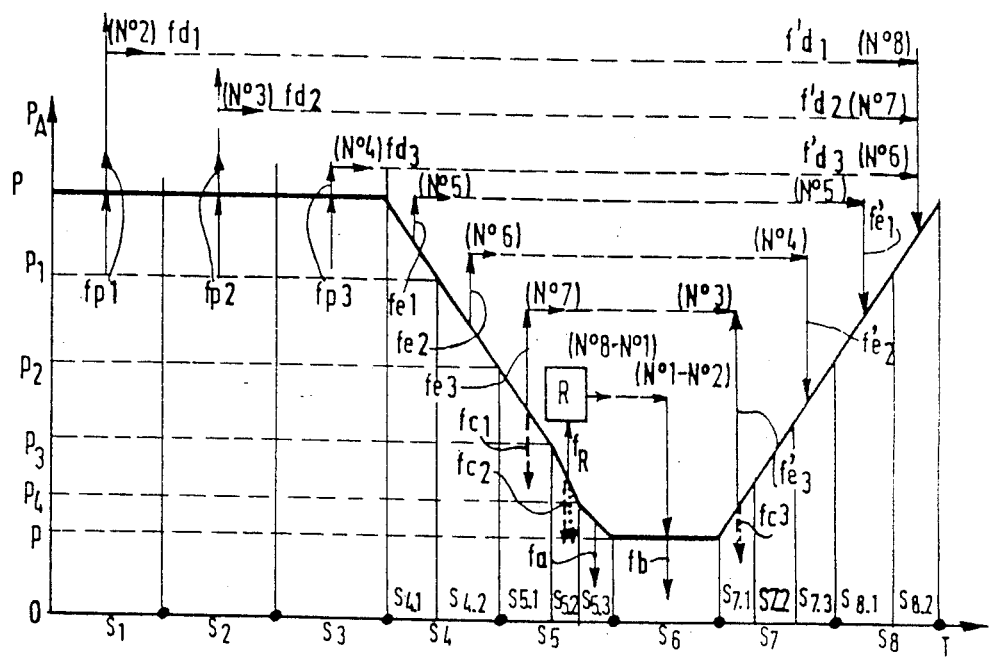

With reference now to FIG. 5, the plant has eight adsorbers Nos 1 to 8; the cycle T has eight phases $S_1$ to $S_8$. Here again, three adsorbers are simultaneously undergoing isobaric production since the production operation extends over three phases $S_1$, $S_2$ and $S_3$, and there are here effected three successive pressure equalizations:
on one hand, at $S_{4.1}$: pressure equalization of the adsorber No 1 undergoing decompression with the adsorber No 5 undergoing recompression according to $f_{e1}$;
on the other hand, at $S_{4.2}$: from the adsorber No 1 to the adsorber No 6 according to $f_{e2}$;
lastly, at $S_{5.1}$: a third pressure equalization of the adsorber No 1 with the adsorber No 7 according to $f_{e3}$.

These three same pressure equalizations are again effected during the recompression of the adsorber No 1, namely:
at $S_{7.1}$: pressure equalization of the adsorber No 1 undergoing a first recompression with the adsorber No 3 according to $f'_{e3}$;
at $S_{7.2}$: pressure equalization of the adsorber No 1 undergoing a second recompression with the adsorber No 4 according to $f'_{e2}$;
at $S_{7.3}$: pressure equalization of the adsorber No 1 undergoing a third recompression with the adsorber No 5 according to $f'_{e1}$.

The final recompression is effected with flows taken from adsorbers No 6 $f'_{d3}$, No 7 $f'_{d2}$, No 8 $f'_{d1}$, at $S_{8.2}$.

Figure 6:
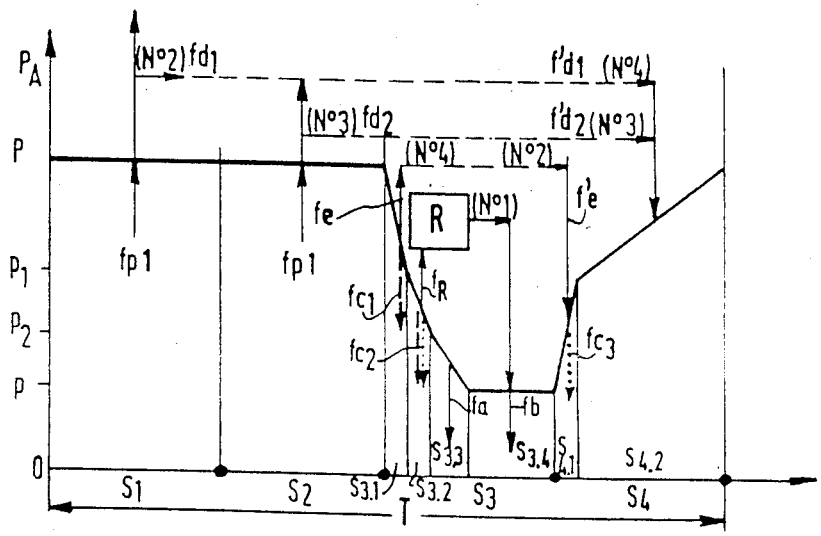

With reference to FIG. 6, the plant here has four adsorbers Nos 1 to 4 with isobaric production during half of cycle T, i.e. in two phases. The production is therefore carried out simultaneously with two adsorbers.

The operations for decompressing and scavenging an adsorber are all carried out during the same phase $S_3$ which is divided into four steps, namely:

at $S_{3.1}$: pressure equalization $f_{e1}$;

at $S_{3.2}$: partial emptying of the adsorber No 1 into the reservoir R according to $f_R$;

at $S_{3.3}$: final decompression according to $f_a$;

at $S_{3.4}$: scavenging according to $f_b$ in the adsorber No 1 with gas coming from the reservoir R, itself put under storage pressure by the gas resulting from the preceding emptying $f_R$.

Figure 7:
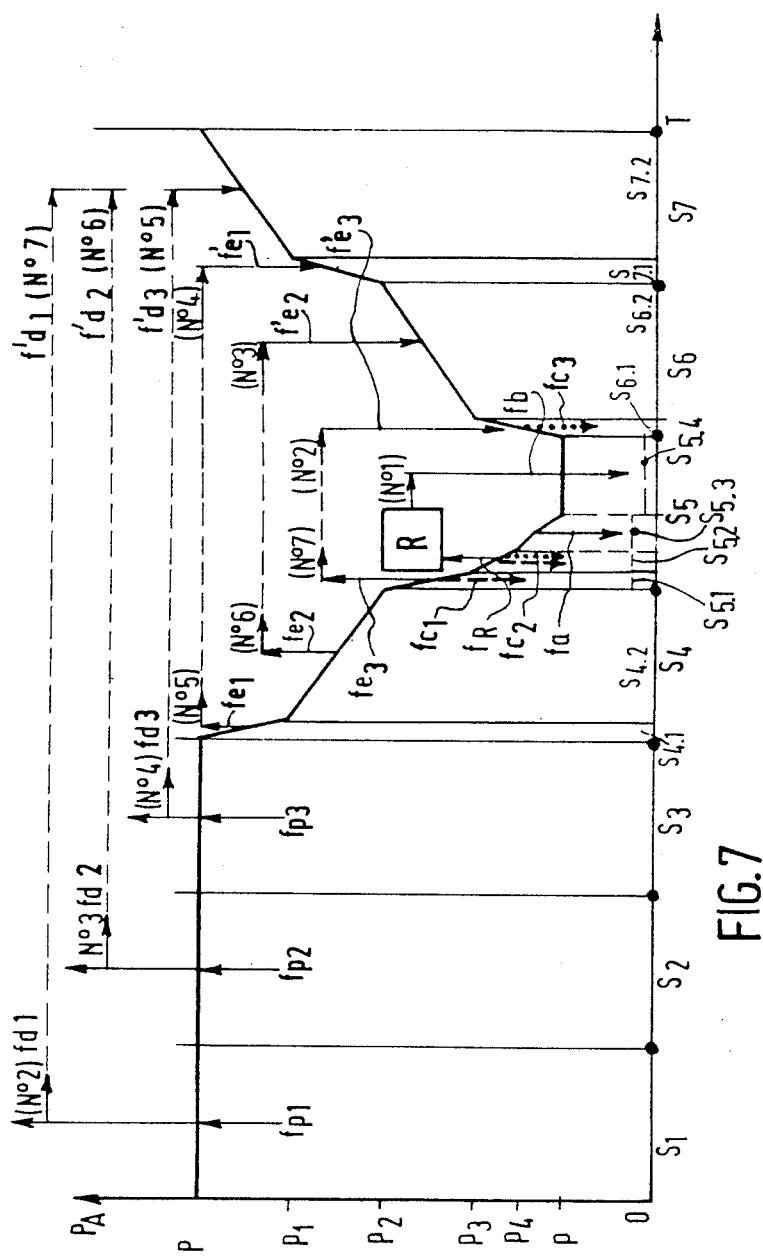

With reference to FIG. 7, a plant here comprises seven adsorbers with an isobaric production which involves three phases, namely a simultaneous production with three adsorbers. Here, there are three cocurrent decompressions by pressure equalization, the first two of which are carried out according to $f_{e1}$ and according to $f_{e2}$ during the periods $S_{4.1}$ and $S_{4.2}$ of the phase $S_4$, while the phase $S_5$ incorporates the third decompression by pressure equalization according to $f_{e3}$ during the period $S_{5.1}$, the partial emptying $f_R$ during the period $S_{5.2}$, the final decompression $f_a$ during the period $S_{5.3}$, the scavenging $f_b$ at the minimum cycle pressure p during the period $S_{5.4}$, the scavenging gas issuing from the reservoir R coming from the partial emptying of the adsorber No 1 during the sub-step $S_{5.1}$.

Figure 8:
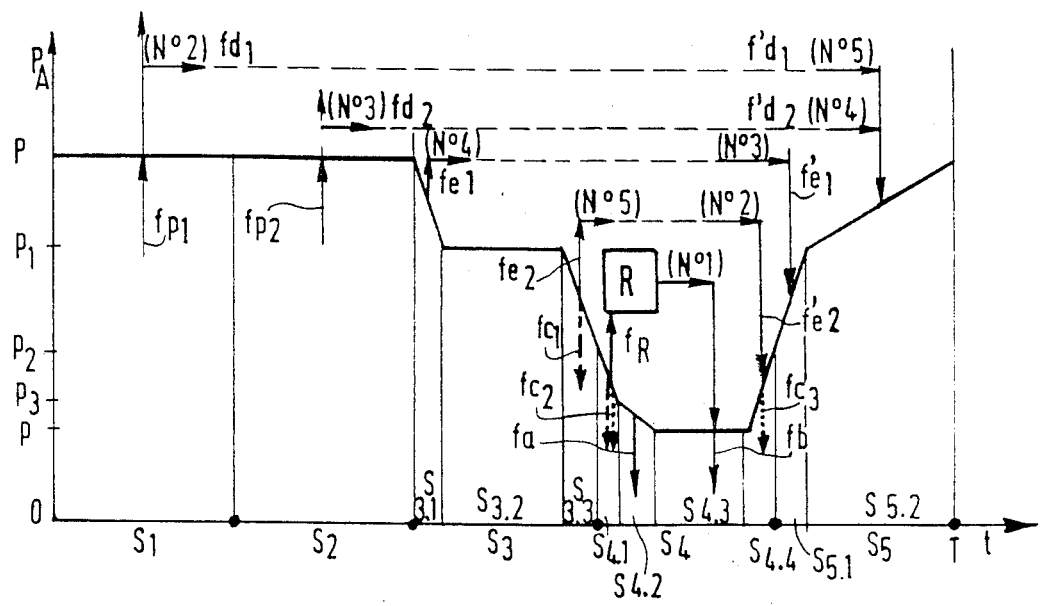

With reference to FIG. 8, the plant here comprises five adsorbers, two of which are in simultaneous isobaric production. Here, the first decompression by pressure equalization $f_{e1}$, effected in period $S_{3.1}$, is followed in period $S_{3.2}$ by an isolation of the adsorber No 1 (there is neither an entry nor an exit of gas in this adsorber) itself followed by a step in period $S_{3.3}$ during which the second decompression is effected by pressure equalization according to $f_{e2}$.

The steps of partial emptying $f_R$, communication with the atmosphere $f_a$, scavenging $f_b$ and first recompression by pressure equalization $f'_{e2}$ are carried out during the phase $S_4$, respectively in $S_{4.1}$, $S_{4.2}$, $S_{4.3}$ and $S_{4.4}$. The second recompression by pressure equalization $f'_{e1}$ and the final recompression $f'_{d1}$ and $f'_{d2}$ are carried out during phase $S_5$ respectively at $S_{5.1}$ and $S_{5.2}$.

Figure 9:
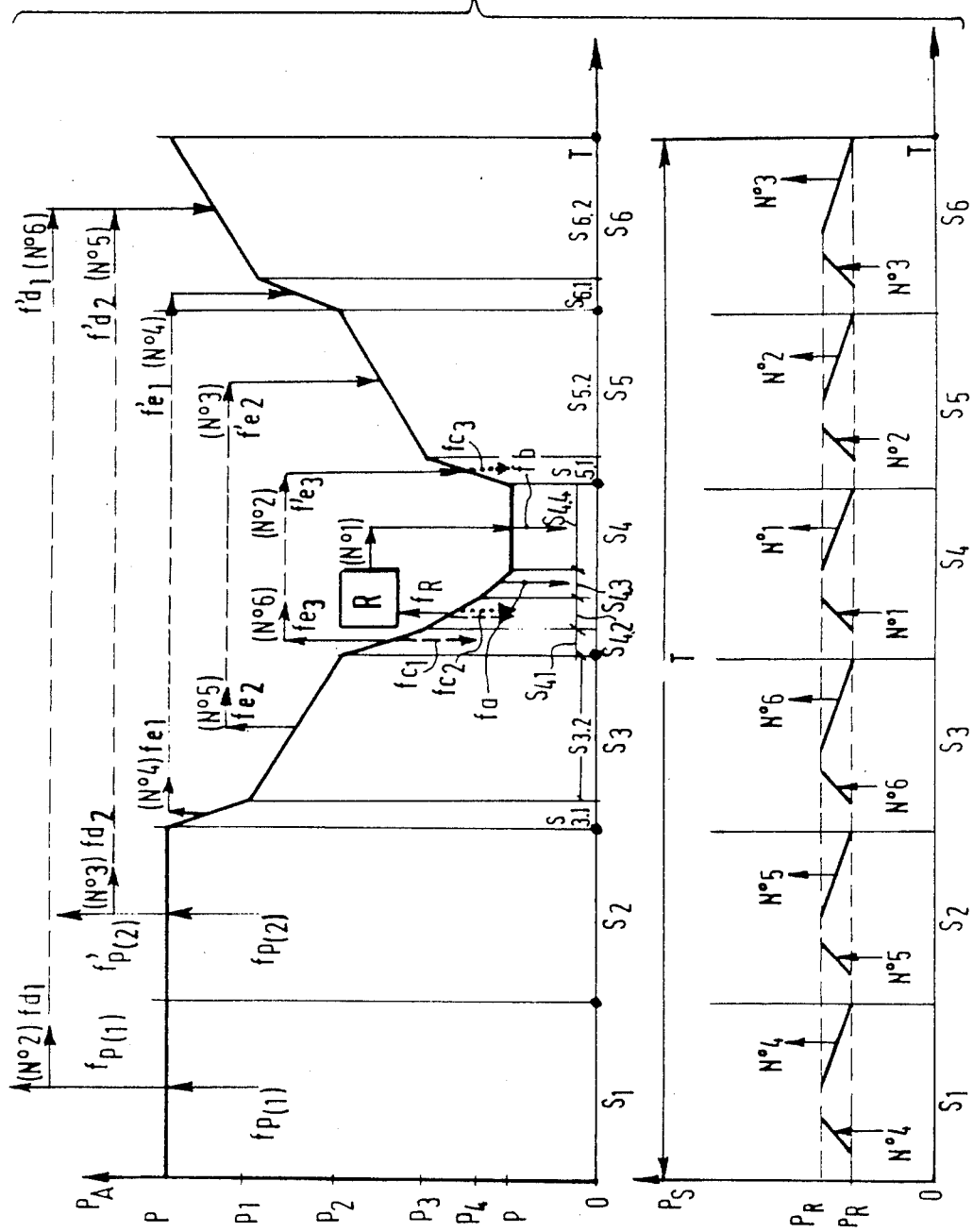

With reference to FIG. 9, a plant here comprises six adsorbers, two of which are in isobaric production with three successive decompressions by pressure equalization, of which two, $f_{e1}$ and $f_{e2}$, are effected during phase $S_3$, whereas the phase $S_4$ incorporates the third decompression by pressure equalization $f_{e3}$, the partial emptying $f_R$ into the reservoir R, the final decompression $f_a$ and the scavenging $f_b$ with gas coming from the preceding partial emptying of the adsorber No 1 into the reservoir R.

Figure 10:
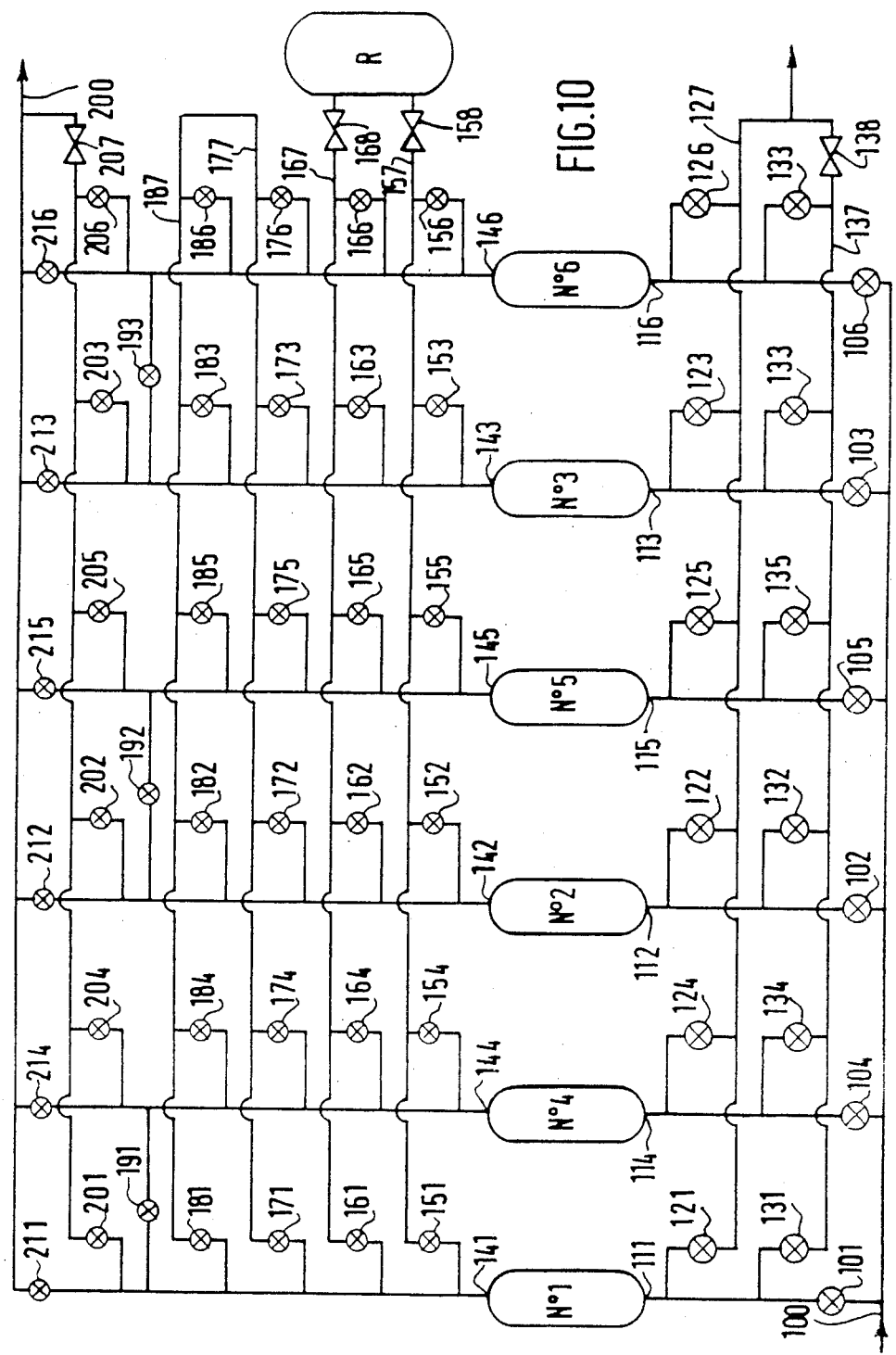
FIG. 10 is a diagram of the complete plant.

FIG. 10 shows a diagram of a plant employing the cycle represented in FIG. 9 with six adsorbers Nos 1, 2, 3, 4, 5, 6, each of the adsorbers being fed with treated gas through a pipe 100 connected, through an electrically-operated valve 101, 102, 103, 104, 105, 106, to an inlet supply end 111, 112, 113, 114, 115, 116, which is itself connected through valves 121, 122, 123, 124, 125, 126, to a pipe 127 for, on one hand, a direct communication with the air and, on the other hand, through valves 131, 132, 133, 134, 135, 136 to a pipe communicating with the air 137 including a regulating valve 138. The production outlet 141, 142, 143, 144, 145, 146 of the adsorbers is connected:

on one hand, by electrically-operated valves 151, 152, 153, 154, 155 and 156 to a pipe 157 having a regulating valve 158 leading to the reservoir R;

on the other hand, by electrically-operated valves 161, 162, 163, 164, 165 and 166 to a pipe 167 having a regulating valve 168 also leading to the reservoir R;

by electrically-operated valves 171, 172, 173, 174, 175 and 176 to a pipe 177 which is connected to a pipe 187 connected by valves 181, 182, 183, 184, 185 and 186 to the outlet ends 141 to 146.

The outlet end 141 is connected to the outlet end 144 by an electrically-operated valve 191. The outlet end 142 is connected to the outlet end 145 by an electrically-operated valve 192; the outlet end 143 is connected to the outlet end 146 by an electrically-operated valve 193. A production pipe 200 is connected through a regulating valve 207 respectively by electrically-operated valves 201, 202, 203, 204, 205 and 206 to the outlets 141, 142, 143, 144, 145 and 146, on one hand, and, on the other hand, by electrically-operated valves 211, 212, 213, 214, 215 and 216 directly to the outlets 141, 142, 143, 144, 145 and 146.

It can easily be seen that such a plant is capable of carrying out the various operating cycles and there are indicated by way of example with reference to the notations employed in FIG. 9: the various operations on each of the adsorbers Nos 1 to 6 during a first fraction of time of duration T/6 corresponding to the duration of a phase.

(a) the adsorber No 1 is in phase $S_1$ of the first production step according to $f_{p1}$ ensured by the opening of the valves 101 and 211;

(b) the adsorber No 2 is in phase $S_6$ and is subjected in succession to the steps corresponding to $S_{6.1}$ and $S_{6.2}$. The step $S_{6.1}$, which effects the recompression of the adsorber No 2 according to $f'_{e1}$ by the first pressure equalization $f_{e1}$–$f'_{e1}$ between the adsorbers No 5 and No 2, is ensured by the opening of the valve 192. The step $S_{6.2}$, which effects the final recompression $(f'_{d1})$ and $(f'_{d2})$, is ensured by the opening of the valve 202 through the regulating valve 207. The gas is withdrawn from the production line 200 fed by the adsorber No 1 in the first production phase as indicated at (a) and by the adsorber No 6 in the second production phase as will be indicated at (f);

(c) the adsorber No 3 is in phase $S_5$ and is subjected in succession to the two steps corresponding to $S_{5.1}$ and $S_{5.2}$. The step $S_{5.1}$ which effects the recompression of the adsorber No 3 according to $f'_{e3}$ by the third pressure equalization $f_{e3}$–$f'_{e3}$ between the adsorbers No 4 and No 3, is ensured by the opening of the valves 104 and 173. The step $S_{5.2}$ which effects the recompression of the adsorber No 3 according to $f'_{e2}$ by the second pressure equalization $f_{e2}$–$f'_{e2}$ between the adsorbers No 5 and No 3, is ensured by the opening of the valves 185 and 173;

(d) the adsorber No 4 is in phase $S_4$ and is subjected in succession to the four steps corresponding to $S_{4.1}$, $S_{4.2}$, $S_{4.3}$, $S_{4.4}$. The step $S_{4.1}$ which effects the decompression of the adsorber No 4 according to $f_{e3}$ by the third pressure equalization $f_{e3}$–$f'_{e3}$ between the adsorbers No 4 and No 3, is ensured by the opening of the valves 184 and 173 as indicated at (c). Step $S_{4.2}$ which effects the decompression $f_R$ with storage in the reservoir R, is effected by the opening of the valve 164 through the regulating valve 168. The step $S_{4.3}$ which effects the final decompression $f_a$, is ensured by the opening of the valve 134 through the regulating valve 138. The step $S_{4.4}$ which effects the elution $f_b$ of the adsorber with the gas stored in the reservoir R, is ensured by the opening of the valves 154 and 124 through the regulating valve 158;

(e) the adsorber No 5 is in phase $S_3$ and is subjected in succession to the two steps corresponding to $S_{3.1}$ and $S_{3.2}$. The step $S_{3.1}$ which effects the decompression of the adsorber No 5 according to $f_{e1}$ by the first pressure equalization $f_{e1}$–$f'_{e1}$ between the adsorbers No 5 and No 2, is ensured by the opening of the valve 192 as indicated at (b). The step $S_{3.2}$ which effects the decompression of the adsorber No 5 according to $f_{e2}$ by the second pressure equalization $f_{e2}$–$f'_{e2}$ between the adsorbers No 5 and No 2, is ensured by the opening of the valves 185 and 173 as indicated at (c);

(f) the adsorber No 6 is in phase $S_2$ and is subjected to the second production step $f_{p2}$ ensured by the opening of the valves 106 and 216.

In the course of time by successive fractions of duration T/6, the same steps are carried out on each of the adsorbers with staggering of the numeral of the adsorbers affected by the operations. Thus, for the second fraction of time of duration T/6, the operations described at (a), (b), (c), (d), (e), (f) are carried out respectively on the adsorbers No 2, No 3, No 4, No 5, No 6 and No 1 and so on, with opening of the valves corresponding to the operations carried out.

Figure 11:
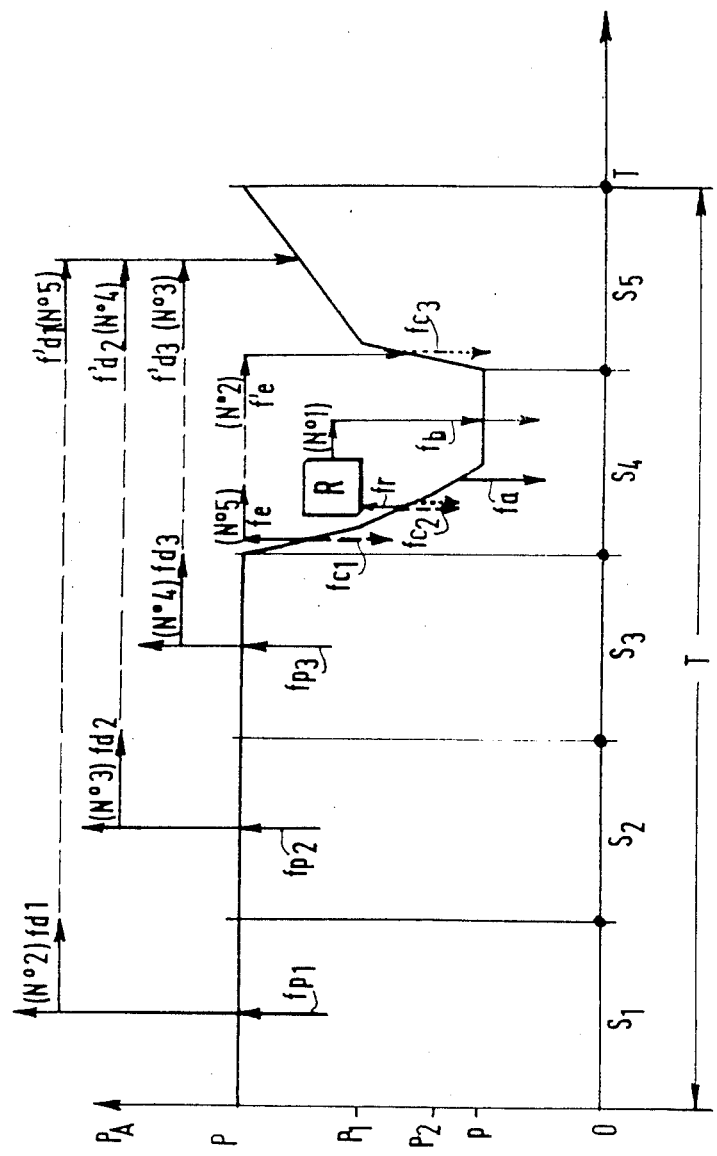
FIGS. 11 to 18 show other alternative embodiments.

According to FIG. 11, a cycle employs five adsorbers, three of which are simultaneously in isobaric production. One adsorber is therefore in production during the phases $S_1$ ($f_{p1}$) $S_2$($f_{p2}$) $S_3$($f_{p3}$), undergoing decompression ($f_e$, $f_R$, $f_a$) and scavenging ($f_b$) during the phases $S_4$, then recompression ($f'_e$, $f'_{d3}$, $f'_{d2}$, $f'_{d1}$) during the phase $S_5$.

Figure 12:
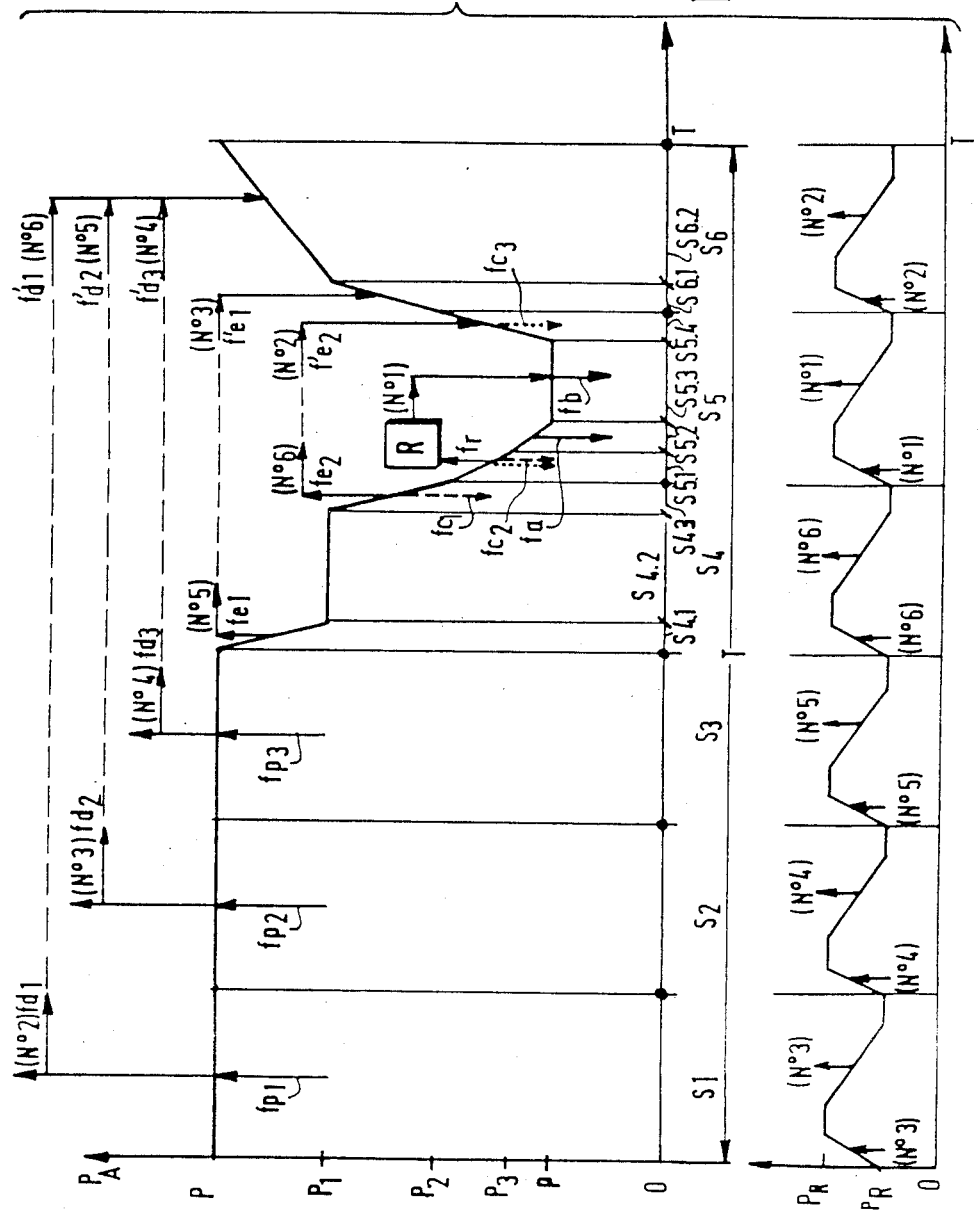

According to FIG. 12, a cycle employs six adsorbers each being cyclically subjected to three isobaric production steps during the phases $S_1$, $S_2$, $S_3$.

two decompressions by pressure equalization ($f_{e1}$) and ($f_{e2}$) separated by a pressure plateau during the phase $S_4$, a final decompression ($f_a$), a scavenging ($f_b$) and a first recompression pressure equalization ($f'_{e2}$) during the phase $S_5$, a recompression (pressure equalization $f'_{e1}$ and branching off of the production $f'_{d3}$, $f'_{d2}$, $f'_{d1}$) during the phase $S_6$.

Figure 13:
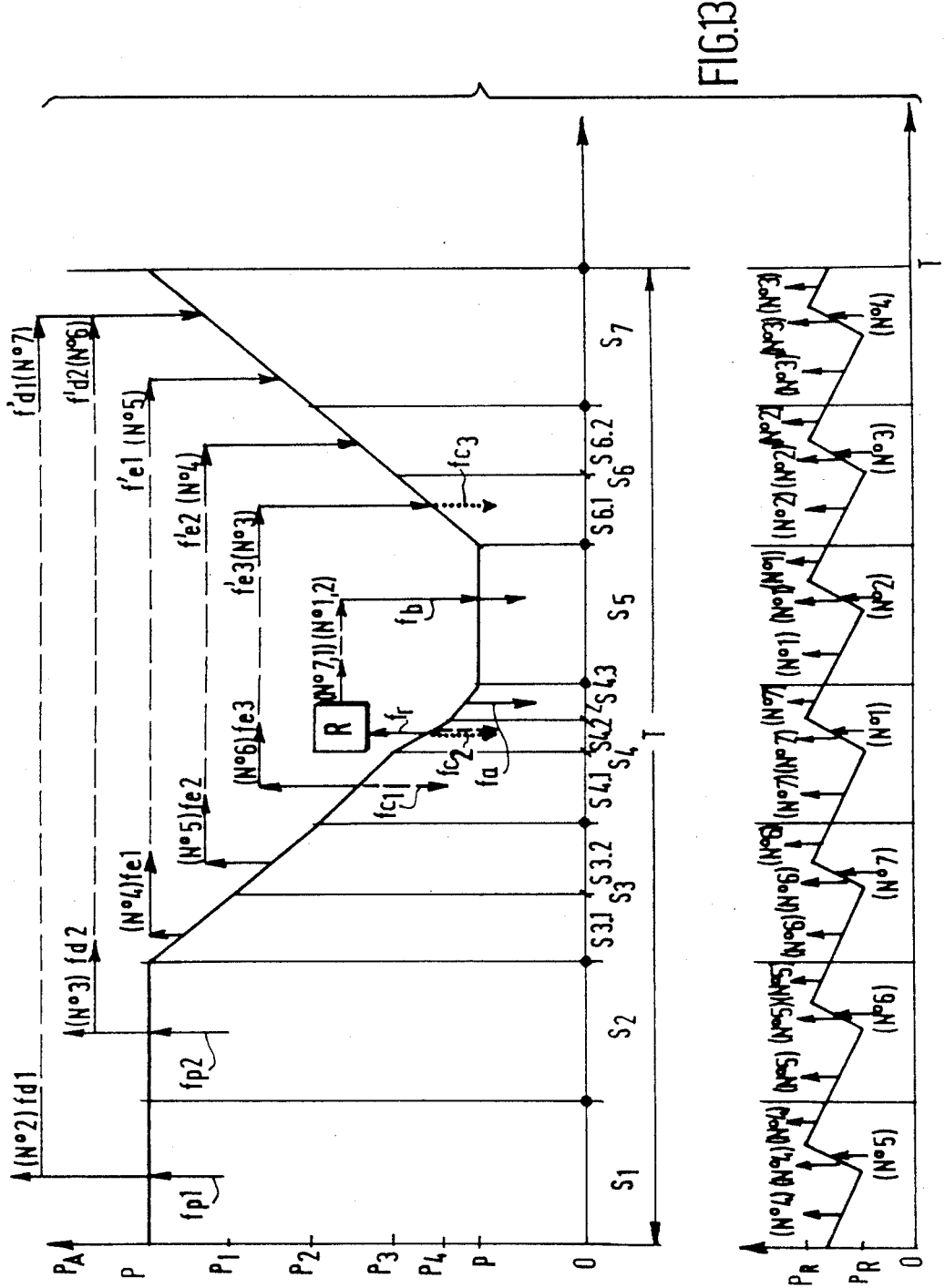

According to FIG. 13, seven adsorbers are employed and there are two isobaric production phases. The decompressions and recompressions each last for two phases ($S_3$–$S_4$ for the decompressions; $S_6$–$S_7$ for the recompressions) and the scavenging lasts for a phase ($S_5$).

Figure 14:
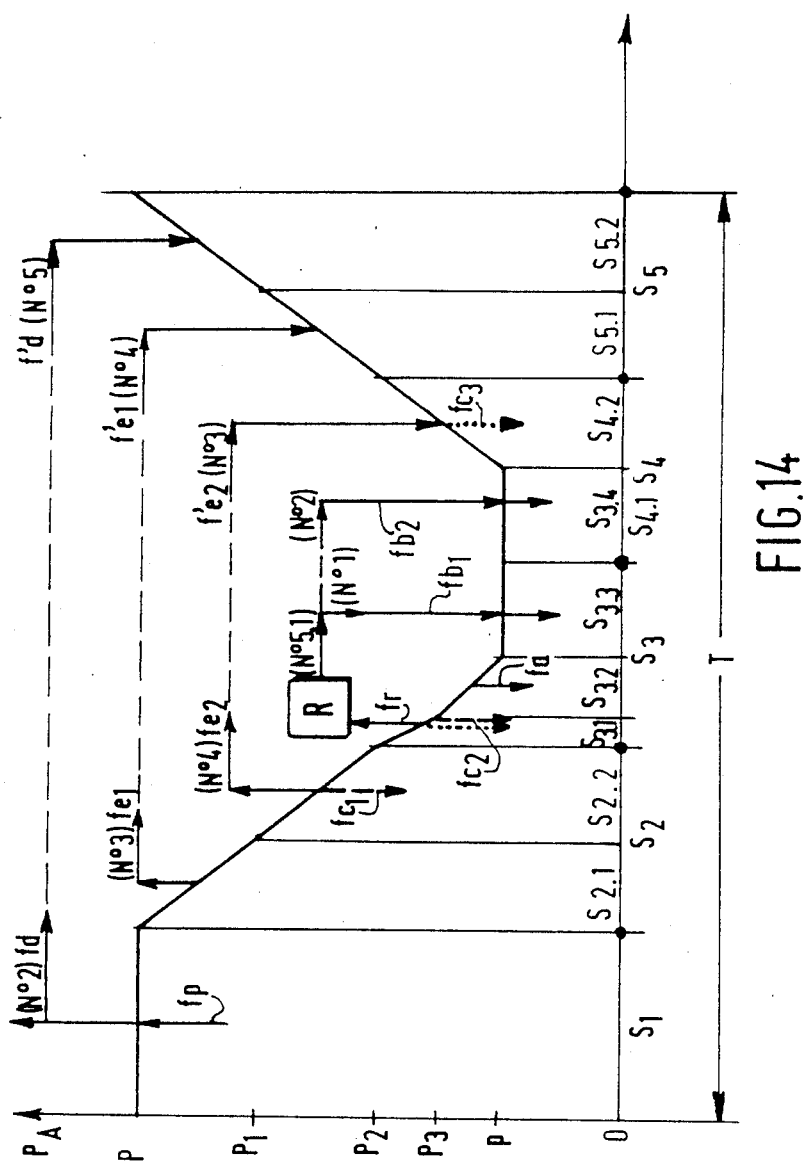

According to FIG. 14, five adsorbers are employed with two decompressions by pressure equalization ($f_{e1}$, $f_{e2}$) and two recompressions by pressure equalization ($f'_{e2}$, $f'_{e1}$) with a single adsorber in production ($S_1$) and the scavenging lasting a part of the two phases $S_3$ and $S_4$ during the steps $S_{3.3}$ and $S_{4.1}$.

Figure 15:
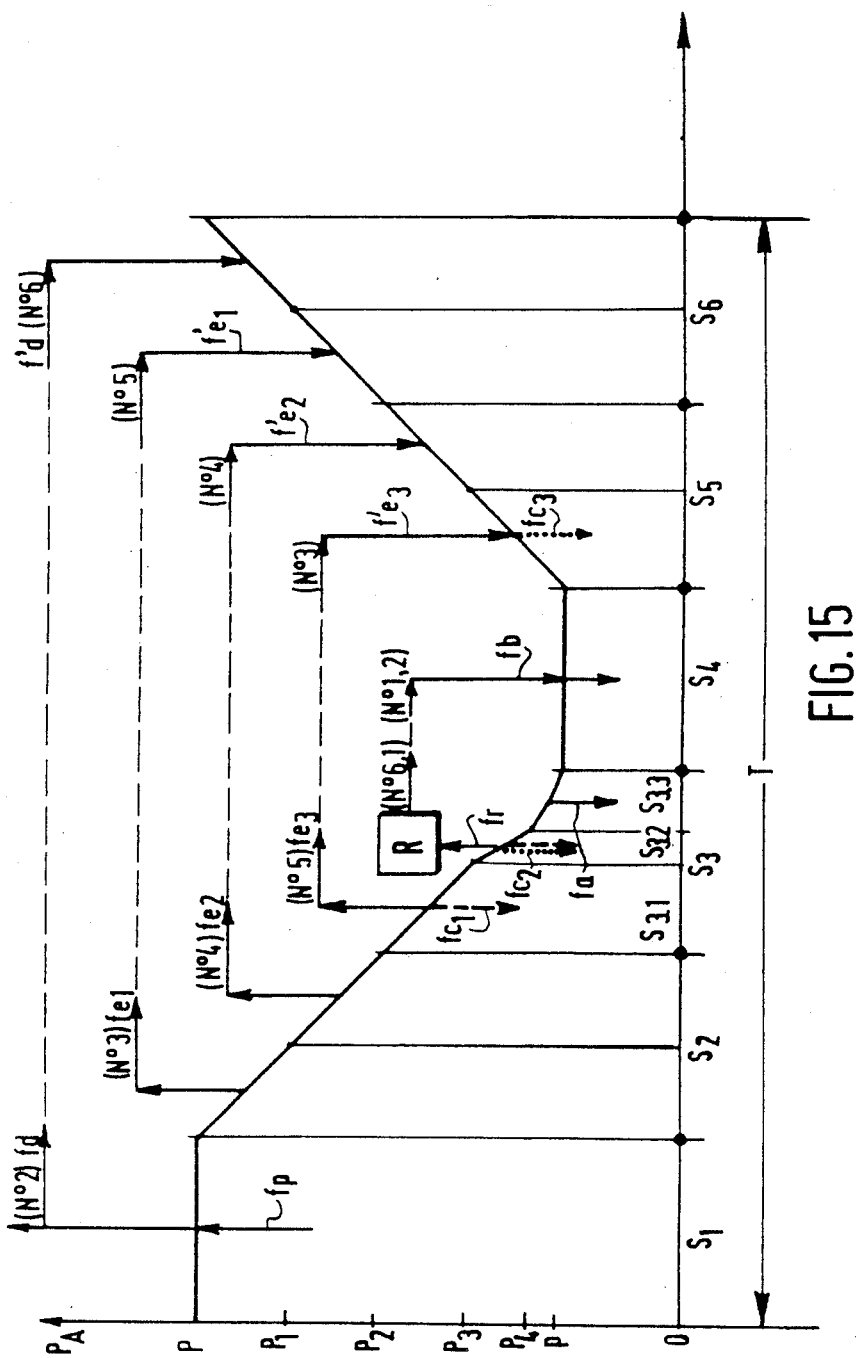

According to FIG. 15, six adsorbers are employed with a single adsorber in production ($S_1$), three decompression pressure equalizations $f_{e1}$, $f_{e2}$ ($S_2$), $f_{e3}$($S_{3.1}$), a rapid decompression to the reservoir R ($S_{3.2}$), a final decompression ($S_{3.3}$) whereas the scavenging $f_b$ lasts for the whole of the duration of phase ($S_4$).

Figure 16:
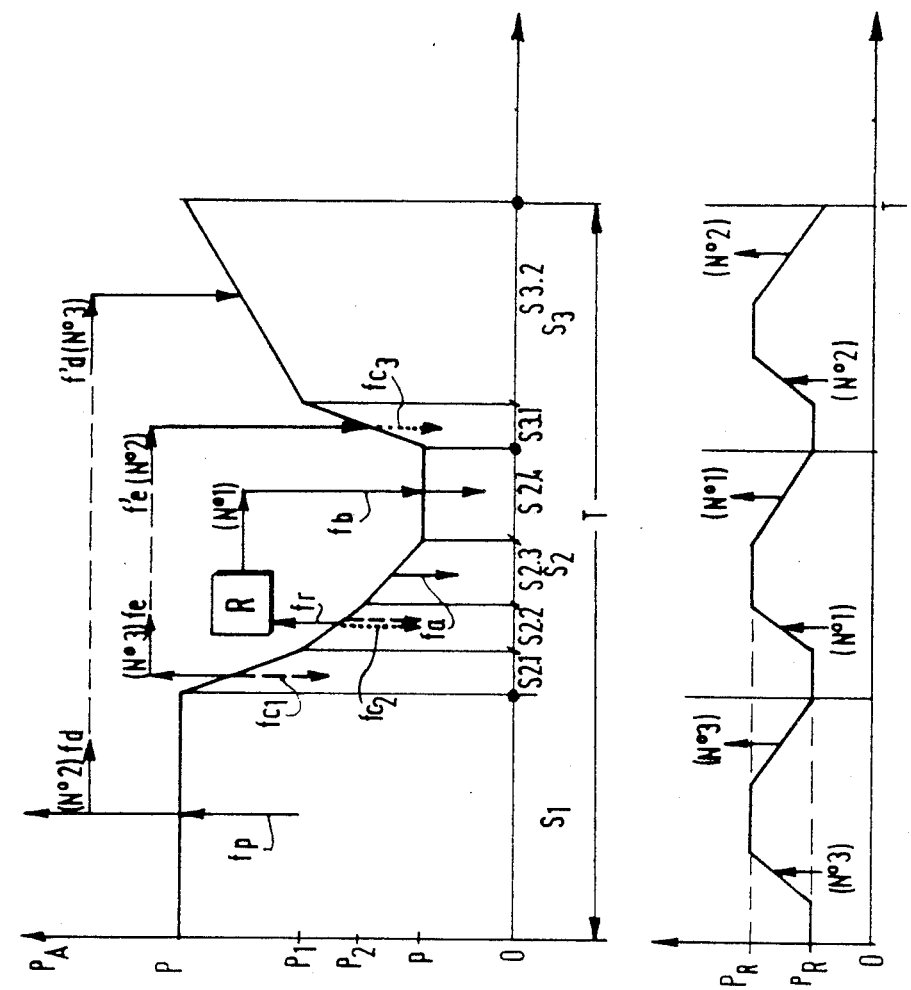

According to FIG. 16, three adsorbers are employed with a single adsorber in isobaric production and a single pressure equalization. The succession of operations for decompression $f_e$ by pressure equalization, emptying $f_R$ into the reservoir, final decompression $f_a$ and scavenging $f_b$, occurs in the course of the same phase $S_2$.

Figure 17:
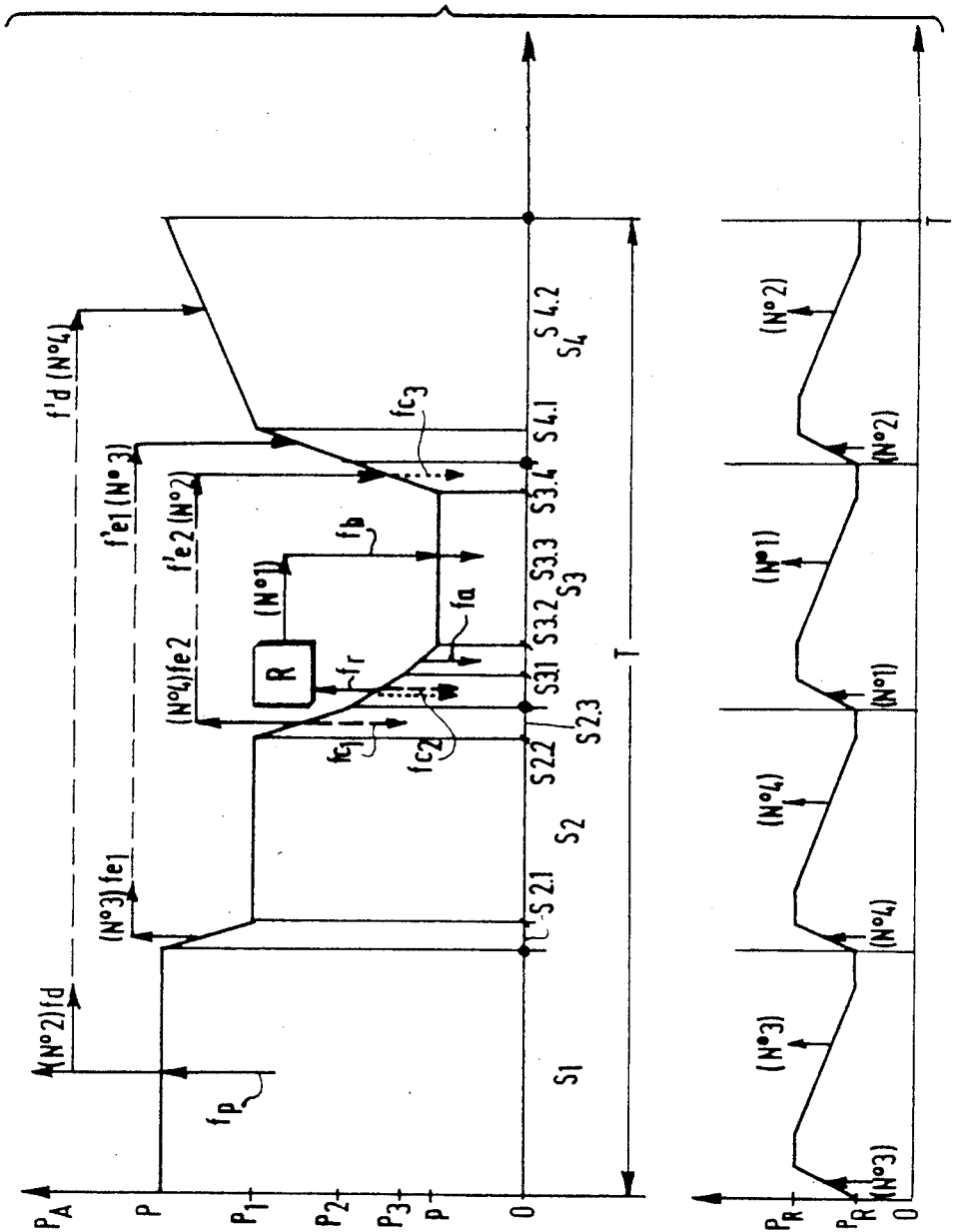

According to FIG. 17, four adsorbers are employed with a single adsorber in isobaric production and two pressure equalizations. The cumulated duration of the successive operations $f_{e2}$, $f_R$, $f_a$ and $f_b$ is equal to the duration of a phase.

Figure 18:
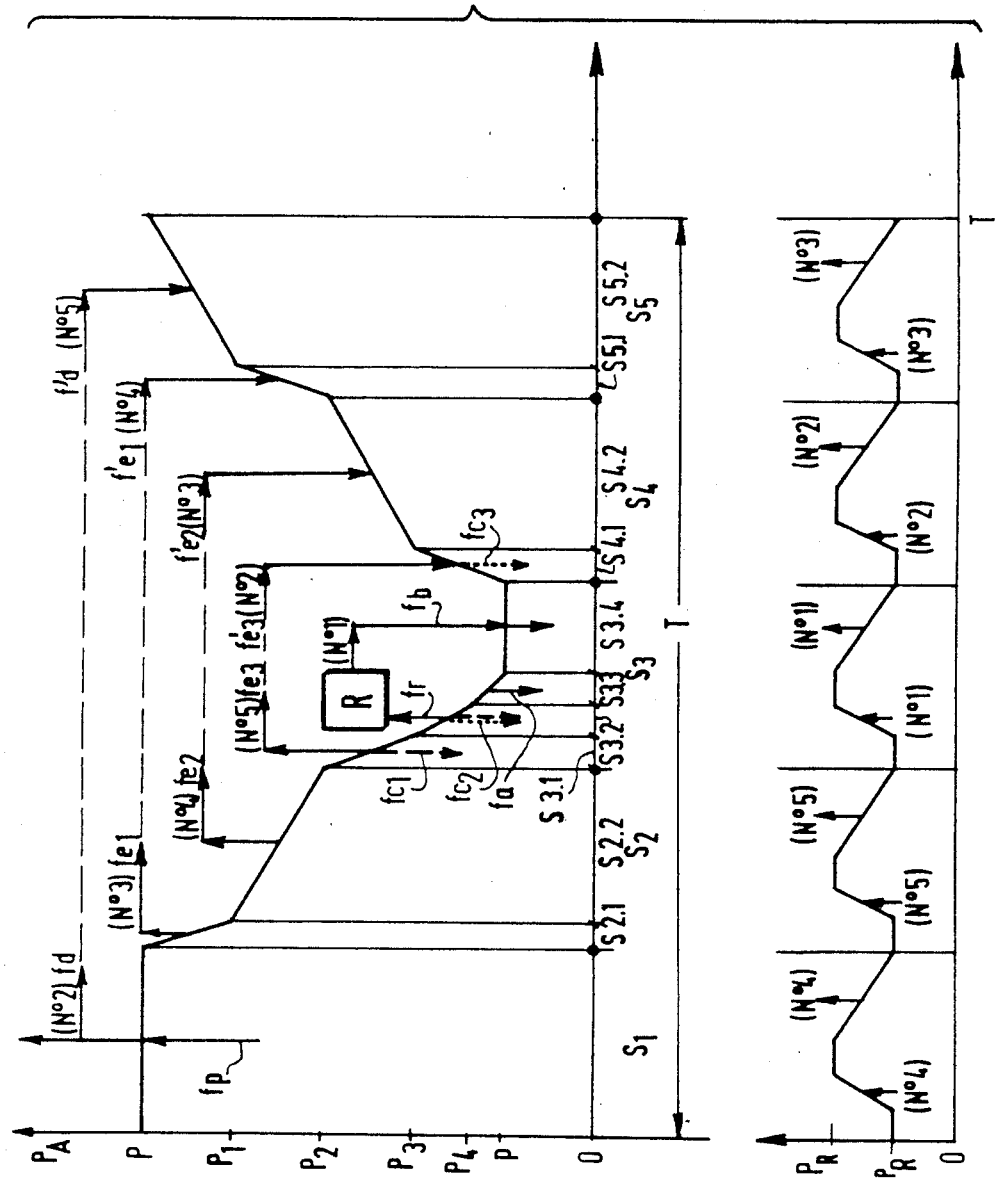

According to FIG. 18, five adsorbers are employed with a single adsober in isobaric production and three pressure equalizations. The cumulated duration of the successive operations $f_{e3}$, $f_R$ and $f_b$ is equal to the duration of a phase.

In all the embodiments described hereinbefore, there is a variable residual gas, i.e. gas extracted from the adsorbers in a countercurrent manner during the steps of final decompression $f_a$ and scavenging $f_b$. In some embodiments, the cumulated duration of the steps $f_a$ and $f_b$ is less than the duration of a phase; the withdrawal of the residual gases is then discontinuous. In other embodiments, the cumulated duration of the steps $f_a$ and $f_b$ is longer than the duration of a phase but shorter than the duration of two phases; the withdrawal of the residual gases is then continuous but at a very variable rate of flow. Now, it may be of interest to be able for each of the previously-described cycles to effect a continuous withdrawal at a rate of flow which is as constant as possible. To achieve this, it is desirable to obtain a countercurrent withdrawal during a period which is equivalent either to the duration of a complete phase or to the duration of two complete phases, i.e., for the described embodiments, to effect two supplementary countercurrent withdrawals. The countercurrent withdrawals are discharged to the free air or a residual gas collector.

There are proposed hereinafter two embodiments of these two supplementary withdrawals:

Alternative A: the two supplementary withdrawals effected in a countercurrent manner are carried out in two steps immediately upstream of the steps $f_a$ and $f_b$, i.e. one, represented by $f_{e2}$ in the course of the partial emptying step $f_R$ to the reservoir R, and the other, represented by $f_{e1}$, in the course of the decompression $f_e$ corresponding to the last pressure equalization.

Alternative B: the two supplementary withdrawals effected in a countercurrent manner are carried out, one, in the step immediately upstream of the step $f_a$, i.e. in the step $f_R$ and according to $f_{e2}$ as above, and the other, represented by $f_{e3}$, in the step immediately downstream of the step $f_b$, i.e. in the first recompression $f'_e$ corresponding to the last pressure equalization.

With reference to the embodiments described hereinbefore and shown in FIGS. 1 to 9 and 11 to 18 in which the operations $f_{e1}$ and $f_{e2}$ of the alternative A have been shown in dashed lines, and the operations $f_{e2}$ and $f_{e3}$ of the alternative B in dotted lines, the following modified cycles are obtained:

FIG. 1

Alternative A. There are effected the successive decompressions from P to $p_1$ (steps $S_{3.1}$) and from $p_1$ to $p_2$ (step $S_{3.2}$) by the simultaneous cocurrent $f_e$ and countercurrent $f_{e1}$ operations, on one hand, and countercurrent $f_R$ and countercurrent $f_{e2}$ operations, on the other hand.

Alternative B. There are effected, on one hand, the decompression from $p_1$ to $p_2$ (step $S_{3.2}$) by the simultaneous cocurrent $f_R$ and countercurrent $f_{e2}$ operations, and, on the other hand, the recompression from p to $p_1$ (step $S_{5.1}$) by the simultaneous countercurrent $f'_e$ and countercurrent $f_{e3}$ operations.

FIG. 2

Alternative A:
   $f_{c1}$ during $f_{e2}$
   $f_{c2}$ during $f_R$
Alternative B:
   $f_{c2}$ during $f_R$
   $f_{c3}$ during $f'_{e2}$

FIG. 3

Alternative A:
   $f_{c1}$ during $f_e$
   $f_{c2}$ during $f_R$
Alternative B:
   $f_{c2}$ during $f_R$
   $f_{c3}$ during $f'_e$

FIG. 4

Alternative A:
   $f_{c1}$ during $f_{e2}$
   $f_{c2}$ during $f_R$
Alternative B:
   $f_{c2}$ during $f_R$
   $f_{c3}$ during $f'_{e2}$

FIG. 5

Alternative A:
   $f_{c1}$ during $f_{e3}$
   $f_{c2}$ during $f_R$
Alternative B:
   $f_{c2}$ during $f_R$
   $f_{c3}$ during $f'_{e3}$

FIG. 6

Alternative A:
   $f_{c1}$ during $f_e$
   $f_{c2}$ during $f_R$
Alternative B:
   $f_{c2}$ during $f_R$
   $f_{c3}$ during $f'_e$

FIG. 7

Alternative A:
   $f_{c1}$ during $f_{e3}$
   $f_{c2}$ during $f_R$
Alternative B:
   $f_{c2}$ during $f_R$
   $f_{c3}$ during $f'_{e3}$

FIG. 8

Alternative A:
   $f_{c1}$ during $f_{e2}$
   $f_{c2}$ during $f_R$
Alternative B:
   $f_{c2}$ during $f_R$
   $f_{c3}$ during $f'_{e2}$

FIG. 9

Alternative A:
   $f_{c1}$ during $f_{e3}$
   $f_{c2}$ during $f_R$
Alternative B:
   $f_{c2}$ during $f_R$
   $f_{c3}$ during $f'_{e3}$

FIG. 11

Alternative A:
   $f_{c1}$ during $f_e$
   $f_{c2}$ during $f_R$
Alternative B:
   $f_{c2}$ during $f_R$
   $f_{c3}$ during $f'_e$

FIG. 12

Alternative A:
   $f_{c1}$ during $f_{e2}$
   $f_{c2}$ during $f_R$
Alternative B:
   $f_{c2}$ during $f_R$
   $f_{c3}$ during $f'_{e2}$

FIG. 13

Alternative A:
   $f_{c1}$ during $f_{e3}$
   $f_{c2}$ during $f_R$
Alternative B:
   $f_{c2}$ during $f_R$
   $f_{c3}$ during $f'_{e3}$

FIG. 14

Alternative A:
   $f_{c1}$ during $f_{e2}$
   $f_{c2}$ during $f_R$
Alternative B:
   $f_{c2}$ during $f_R$
   $f_{c3}$ during $f'_{e2}$

FIG. 15

Alternative A:
   $f_{c1}$ during $f_{e3}$
   $f_{c2}$ during $f_R$
Alternative B:
   $f_{c2}$ during $f_R$
   $f_{c3}$ during $f'_{e3}$

FIG. 16

Alternative A:
   $f_{c1}$ during $f_e$
   $f_{c2}$ during $f_R$
Alternative B:
   $f_{c2}$ during $f_R$
   $f_{c3}$ during $f'_e$

FIG. 17

Alternative A:
   $f_{c1}$ during $f_{e2}$
   $f_{c2}$ during $f_R$
Alternative B:
   $f_{c2}$ during $f_R$
   $f_{c3}$ during $f'_{e2}$

FIG. 18

Alternative A:
 $f_{c1}$ during $f_{e3}$
 $f_{c2}$ during $f_R$

Alternative B:
 $f_{c2}$ during $f_R$
 $f_{c3}$ during $f'_{e3}$

What is claimed is:

1. A process for separating a gas mixture by adsorption, comprising effecting on each of at least four adsorbers the same cycle of the following successive operations, the cycles being staggered from one adsorber to the following by a phase shift equal to the duration of a cycle divided by the number of said adsorbers, said cycle comprising the steps of:
  (a) an isobaric production operation at a high pressure of the cycle, termed a cocurrent operation;
  (b) a cocurrent decompression by at least one direct pressure equalization between said adsorber undergoing decompression and another adsorber undergoing countercurrent recompression;
  (c) a further cocurrent partial direct decompression into a single storage reservoir, said cocurrent partial decompression occupying a duration of time;
  (d) a final countercurrent decompression to a low pressure of the cycle;
  (e) a countercurrent scavenging at said low pressure with gas exclusively taken from the storage reservoir, said countercurrent scavenging occupying a duration of time which is longer than the duration of time occupied by the cocurrent decompression operation according to (c);
  (f) a partial direct countercurrent recompression by at least one pressure equalization of the type according to (b);
  (g) a final countercurrent recompression to the high pressure of the cycle by a flow of gas taken from the isobaric production flow; in which process:
  (h) the sum of the durations of the operations according to (c), (d) and (e) is less than said phase shift;
  (i) the total number of adsorbers is less than or equal to $1+x+y$, x being the number of adsorbers simultaneously in isobaric production and y the number of direct pressure equalizations between two adsorbers, with $x+y$ at least equal to three;
  (j) the gas entering into said single storage reservoir is exclusively used as scavenging gas in the scavenging step (e);
  (k) the gas coming from an adsorber in decompression and loading said storage reservoir is thereafter used in a later phase for scavenging the same adsorber; and
  (l) a filling of the storage reservoir (from its minimum pressure to its maximum pressure) with depressurizing gas according to step (c) is effected during a duration of time which does not overlap the duration of time during which an emptying of said storage reservoir (from its maximum pressure to its minimum pressure) from gas used exclusively for the scavenging according to step (e) is effected.

2. A separating process according to claim 1, wherein there are two adsorbers simultaneously in isobaric production, the number of adsorbers being from four to seven, while the number of pressure equalization is one for a total number of adsorbers equal to four, two for a total number of adsorbers equal to five, and three for a total number of adsorbers equal to six.

3. A separating process according to claim 1, wherein there are three adsorbers in simultaneous isobaric production, the number of adsorbers being from five to seven, and the number of pressure equalizations is one for a total number of adsorbers equal to five, two for a total number of adsorbers equal to six, and three for a total number of adsorbers equal to seven.

4. A separating process according to claim 1, wherein there is only one adsorber in isobaric production, the number of adsorbers being from four to six, whereas the number of pressure equalizations is two for a total number of adsorbers equal to four, three for a total number of adsorbers equal to five and four for a total number of adsorbers equal to six.

5. A separating process according to claim 1, comprising effecting simultaneously with the cocurrent partial decompression into the reservoir according to (c) a countercurrent withdrawal of gas to the free air or to a residual gas collector from the adsorber undergoing partial decompression.

6. A separating process according to claim 1, comprising effecting simultaneously with the cocurrent decompression in the course of the pressure equalization according to (b) which immediately precedes the partial decompression according to (c), a countercurrent withdrawal of gas to the free air or to a residual gas collector from the adsorber undergoing decompression.

7. A separating process according to claim 1, comprising effecting simultaneously with the partial direct countercurrent recompression in the course of the pressure equalization according to (f) which immediately follows the scavenging according to (e), a countercurrent withdrawal of gas to the free air or to a residual gas collector from the adsorber undergoing recompression.

8. A separating process according to claim 1, comprising effecting simultaneously with the cocurrent decompression in the course of the pressure equalization according to (b) which immediately precedes the partial decompression according to (c), a countercurrent withdrawal of gas to the free air or to a residual gas collector from the adsorber undergoing decompression, and effecting simultaneously with the partial cocurrent decompression into the reservoir according to (c), a countercurrent withdrawal of gas to the free air or to the residual gas collector from the adsorber undergoing partial decompression.

9. A separating process according to claim 8, wherein the low pressure is atmospheric pressure and the countercurrent withdrawals are discharged to the free air.

10. A separating process according to claim 8, comprising effecting the discharge of the countercurrent withdrawals in a residual gas collector whose pressure is generally different from atmospheric pressure, the low pressure of the cycle being the pressure of the residual gas collector.

11. A separating process according to claim 1, comprising effecting simultaneously with the partial countercurrent recompression in the course of the pressure equalization according to (f) which immediately follows the scavenging according to (e), a countercurrent withdrawal of gas to the free air or to a residual gas collector from the adsorber undergoing recompression, and effecting simultaneously with the cocurrent partial decompression into the reservoir according to (c), a countercurrent withdrawal of gas to the free air or to the residual gas collector from the adsorber undergoing partial decompression.

12. A separating process according to claim 1, comprising effecting the countercurrent partial direct recompression in the course of the pressure equalization according to (f) which immediately precedes the final recompression according to (g), simultaneously by the gas issuing from the pressure equalization between two adsorbers and by the gas withdrawn from the production.

13. A separating process according to claim 1, comprising effecting the countercurrent scavenging according to (e) simultaneously by gas issuing from the storage reservoir and by gas withdrawn from the production.

14. A separating process according to claim 1, for purifying hydrogen by separation of at least one undesirable constituent therefrom.

15. A process according to claim 14, wherein said undesirable constituent is selected from the group consisting of $N_2$, $O_2$, A, CO, $CO_2$, hydrocarbons and other impurities.

16. A separating process according to claim 1, for the treatment of natural gas.

17. A separating process according to claim 1, for the elimination of impurities contained in helium.

18. A separating process according to claim 1, for enrichment with oxygen.

19. A separating process according to claim 1, for the separation of oxygen from the air.

* * * * *